Oct. 6, 1925.
J. H. HOPKINS
VAPORIZING DEVICE
Filed Nov. 14, 1921
1,556,114
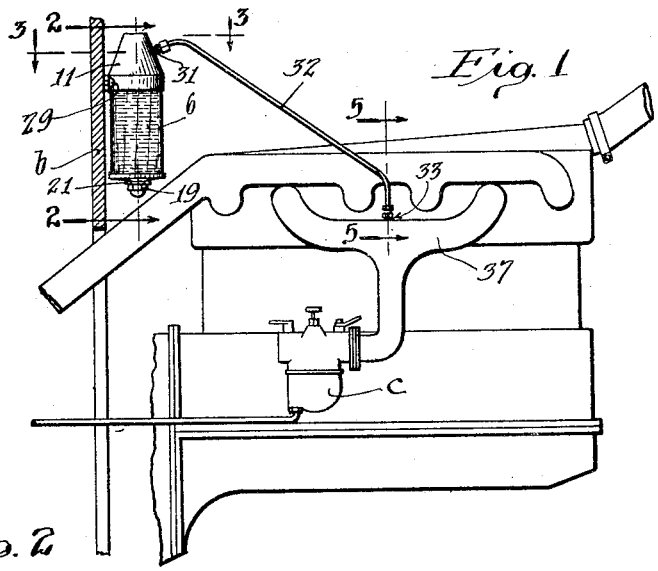
Fig. 1
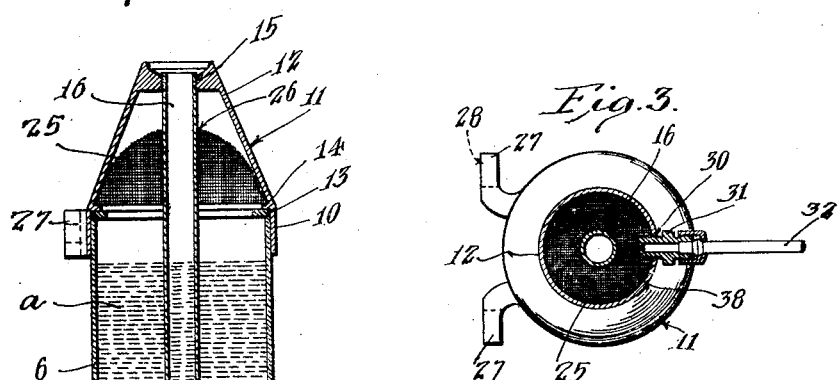
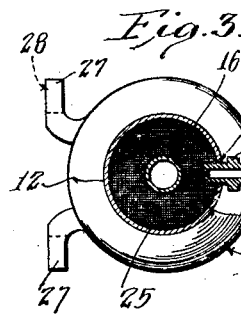
Fig. 3.
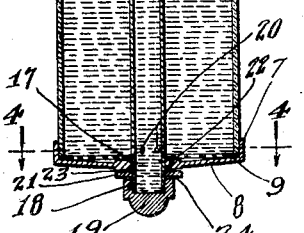
Fig. 4.
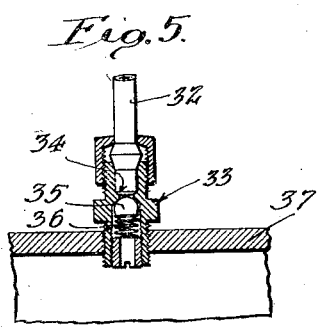
Fig. 5.
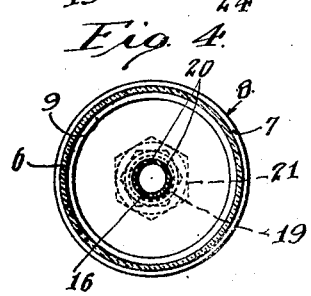
Inventor
James H. Hopkins
By Lyon & Lyon, attys Patented Oct. 6, 1925.

1,556,114

UNITED STATES PATENT OFFICE.

JAMES H. HOPKINS, OF LOS ANGELES, CALIFORNIA, ASSIGNOR, BY MESNE ASSIGNMENTS, TO VAPOR LUBRICANT COMPANY, OF LOS ANGELES, CALIFORNIA, A CORPORATION OF CALIFORNIA.

VAPORIZING DEVICE.

Application filed November 14, 1921. Serial No. 514,935.

*To all whom it may concern:*

Be it known that I, JAMES H. HOPKINS, a citizen of the United States, residing at Los Angeles, in the county of Los Angeles and State of California, have invented a new and useful Vaporizing Device, of which the following is a specification.

This invention relates to means for inducting a liquid, other than liquid fuel, by the difference between atmospheric pressure and that within the intake manifold into an internal combustion motor, and also relates to the method of lubricating the interior of the upper portions of the cylinders so as to prevent or minimize the deposition of carbon and so as to more efficiently lubricate those surfaces which cannot be lubricated to advantage by the lubricant contained in the crank case of the motor.

An object of this invention is to provide an efficiently operating apparatus of this character and one in which the level of the contained liquid can be readily noted by sight.

Another object is to provide for supplemental lubrication of the motor cylinders with minimum mixing of the lubricant with the combustible charge supplied to the motor.

The accompanying drawings illustrate an apparatus by the use of which the new method is effected.

Fig. 1 is a side elevation of an apparatus embodying the invention, which is shown in connection with an internal combustion motor.

Fig. 2 is an enlarged vertical section of the apparatus on line indicated by 2—2, Fig. 1.

Fig. 3 is an enlarged plan section on line indicated by 3—3, Fig. 1.

Fig. 4 is a plan section on line indicated by 4—4, Fig. 2.

Fig. 5 is an enlarged sectional detail on line indicated by 5—5, Fig. 1.

In the drawings is indicated a vertical cylinder 6, preferably constructed of light-transmitting material such as glass. The lower end of the cylinder 6 seats within an annular flange 7 of a lower head 8. Within the head 8 is a washer 9 upon which the bottom edge of the cylinder rests so as to make a fluid tight connection between the cylinder and the head.

The upper end of the cylinder 6 is inserted within an annular flange 10 of an upper head 11. Preferably the head 11 is reduced in diameter upwardly as indicated at 12 so as to produce a frusto-conical portion. The upper edge of the cylinder 6 seats against a washer 13 which rests against the under face of an annular lip 14 inside of the head 11, thus making a fluid-tight connection between the cylinder and upper head.

The upper end of the head 11 is provided with a screw-threaded opening 15 engaged by the screw-threaded upper end of a vertical tube 16 positioned axially of the cylinder 6. The lower end of the tube 16 projects through an opening 17 in the head 8 and is screw-threaded, as indicated at 18, to receive a screw-threaded cap 19 that closes the lower end of the tube. When the cylinder is to be drained for cleaning purposes, the cap 19 will be unscrewed while the head 8 is held in place by the operator, thus permitting the contents of the cylinder to slowly flow from the cylinder through the ports 20 into a suitable receptacle that may be placed beneath the cylinder to receive the liquid. The upper end of the tube 16 opens through the head 11 to the atmosphere. The tube 16 communicates adjacent its lower end with the interior of the cylinder 6 through a port or ports 20.

Screw-threaded onto the tube 16 between the cap 19 and head 8 is a nut 21 which is tightened up so as to hold the heads 8, 11 toward one another to securely clamp the cylinder 6 between said heads against the washers 9, 13. Thus the liquid, indicated at *a* cannot leak from the cylinder. The opening 17 is preferably counter-sunk, as indicated at 22, to receive the upwardly projecting flange of a washer 23, which thus aids in preventing leakage of the liquid around the tube 16 at the point where said tube passes out of the opening 17. It is also preferable to employ another washer 24 between the cap 19 and nut 21, though it is to be understood that such washer may be omitted.

Within the head 11 is a screen 25 provided with a central opening 26 to accommodate the tube 16. The screen 25 closing fits the periphery of the tube and is preferably domeshaped. The screen 25 is detachably held in place by the flange 14 upon which the lower edge of the screen rests. The screen 25 will be bent sufficiently to pass the flange 14 when inserting and removing it.

The head 11 is provided on the flange 10 with a pair of lugs 27 having slots 28 to receive the screws 29 by which the device is secured to the dash b of an automobile.

The head 11 is provided with a threaded hole 30 to receive a connection or nipple 31 on one end of a tube 32. The opposite end of said tube 32 is provided with a valve chamber 33 in which is a valve seat 34 and ball valve 35 adapted to close on said seat. A coil spring 36 in the chamber 33 tends to hold the valve closed, but said spring is readily compressed by the opening action of the valve 35 induced by lowering of pressure in the intake manifold 37, with which the valve chamber is connected. The valve 35 is provided to prevent back pressure, resulting when the engine back fires, which otherwise would cause the liquid a to be discharged out of the top of the tube 16.

The vaporizer above described may, of course, be employed for supplying water or any other desired liquid into the intake manifold. It will be assumed that the liquid a is a relatively high-flash lubricant and the operation of the vaporizer, with such lubricant, will be described in order to make clear applicant's method of lubricating the upper walls of the cylinders of a motor. It is not new to supply small quantities of water to the intake manifold of an internal combustion motor for increasing the percentage of moisture in the combustible charges of fuel and air furnished by the carbureter of the motor, but I have conceived of introducing a relatively high-flash lubricant into the combustible mixture of fuel and air, as said mixture passes to the cylinders of the motor, for the purpose of coating the exposed surfaces of the upper cylinder walls, valves, valve-seats and valve stems with a thin film of oil for the purpose of minimizing the deposition of carbon on these surfaces and so that the oil will efficiently lubricate the valve stems and the surfaces along which the pistons move.

It is not new to place a lubricant in the fuel supply, so that said lubricant will pass through the carbureter and thence to the motor cylinders for additional lubrication of said cylinders; but, when a lubricant passes through the carbureter, it is very finely divided or atomized and thoroughly mixed with the air and liquid fuel and, consequently, when the charge is burnt in the engine the lubricant contained in the charge is also to a large extent burned. Such burning of the lubricant of course produces power, but increases the production of carbon and hence increases the tendency for the deposition of carbon on the internal surfaces of the cylinder, pistons and valves. Naturally, the lubricant when thoroughly mixed with the air and fuel burns to a much greater extent than it does when carried into the engine cylinders in a practically undiluted vapor stream as is effected by the use of the above described apparatus which operates as follows:

The partial vacuum produced in the intake manifold 37 causes a combustible charge to be discharged from the carbureter into the intake manifold 37. If the carbureter operates properly, the charge thus produced is a substantially homogenous mixture of liquid fuel and air. The partial vaccum produced in the intake manifold also causes a relatively minute quantity of the lubricant a to discharge from the nozzle 33 into the stream of combustible mixture as said mixture passes to the cylinders. There is no attempt made to minutely break up the stream of lubricant as it issues from the nozzle 33 and, consequently, said lubricant is not dissipated throughout the mixture of fuel and air but is carried into the motor cylinders in substantially a separate stream. This is due to the fact that the lubricant is a relatively heavy oil and is naturally antagonistic to the dissipation in the stream of air and lighter liquid fuel. The lubricant enters the motor cylinders and is thrown upon the exposed surfaces and spreads thereover so as to thoroughly coat said surfaces with a film of oil. The oil not being finely divided, as it would be if passed through the carbureter, does not readily burn and, therefore, practically all of the lubricant serves in the lubricating capacity.

The size of the orifice 38 of the nipple 31 is dependent upon the size and number of the motor cylinders and, consequently, nipples with different size orifices 38 are interchangeable so that the proper nipple for any given size of motor can be readily furnished with the apparatus.

I claim:

In an apparatus of the character described, the combination of a light-transmitting vertical cylinder, heads at the opposite ends of the cylinder, a vertical tube opening at its upper end through the upper head and having a port for its lower end, the upper head having an internal annular lip, a screen positioned in the upper head and surrounding the tube and resting on the annular lip, and an outlet pipe communicating with the upper head.

Signed at Los Angeles, California, this 9th day of November 1921.

JAMES H. HOPKINS.